US009449546B2

(12) United States Patent
Kuang et al.

(10) Patent No.: US 9,449,546 B2
(45) Date of Patent: Sep. 20, 2016

(54) LED DRIVER, LED DRIVING METHOD AND CONTROLLER FOR LED DRIVER

(71) Applicant: Chengdu Monolithic Power Systems Co., Ltd., Chengdu (CN)

(72) Inventors: Naixing Kuang, Hangzhou (CN); Jiaqi Yu, Hangzhou (CN); Yuancheng Ren, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/582,011

(22) Filed: Dec. 23, 2014

(65) Prior Publication Data

US 2015/0179098 A1 Jun. 25, 2015

(30) Foreign Application Priority Data

Dec. 23, 2013 (CN) .......................... 2013 1 0717707

(51) Int. Cl.

*G06F 3/038* (2013.01)
*G09G 5/00* (2006.01)
*G09G 3/32* (2016.01)
*H05B 33/00* (2006.01)
*H05B 33/08* (2006.01)

(52) U.S. Cl.

CPC ................ *G09G 3/32* (2013.01); *H05B 33/00* (2013.01); *H05B 33/08* (2013.01); *G09G 2310/0289* (2013.01); *G09G 2330/028* (2013.01)

(58) Field of Classification Search

CPC ................... G09G 2330/021; G09G 2330/02; G09G 3/369
USPC ............. 345/76–83, 211–213; 315/171, 186, 315/291; 323/271, 285
See application file for complete search history.

(56) References Cited

U.S. PATENT DOCUMENTS 5,561,671 A * 10/1996 Akiyama ............... G11C 29/36 714/718
5,786,872 A * 7/1998 Miyazaki ................ H04N 9/78 348/669
5,877,802 A * 3/1999 Takahashi ................ H04N 7/18 128/908
6,348,908 B1 * 2/2002 Richley ................... G09F 9/372 250/215
7,248,243 B2 * 7/2007 Murakami ........... G09G 3/3611 326/62
7,456,623 B2 * 11/2008 Hasegawa ............... H02M 1/38 323/284
8,400,079 B2 * 3/2013 Kanamori .......... H05B 33/0809 315/194
8,653,800 B2 * 2/2014 Wachi ..................... H02M 1/36 323/222
8,779,696 B2 * 7/2014 Williams ............. H05B 33/083 315/169.1
9,035,560 B2 * 5/2015 Li ...................... H05B 33/0815 315/186
9,179,519 B2 11/2015 Chen et al.
2002/0097008 A1 * 7/2002 Krummel ........... H05B 41/3921 315/291
2010/0117555 A1 5/2010 Liu et al.
2011/0127925 A1 6/2011 Huang et al.
2011/0194214 A1 8/2011 Yao et al.
2011/0285301 A1 11/2011 Kuang et al.
2012/0104964 A1 5/2012 Hughes
2012/0274293 A1 11/2012 Ren et al.
2013/0134894 A1 5/2013 Kuang
2013/0154487 A1 6/2013 Kuang et al.
2013/0169173 A1 7/2013 Chen et al.
2013/0293154 A1 11/2013 Kuang et al.
2014/0159693 A1 6/2014 Kuang et al.
2014/0168567 A1 * 6/2014 Kikuchi ............. H05B 33/0815 349/61

* cited by examiner

*Primary Examiner* — Kimnhung Nguyen

(57) ABSTRACT

A LED driver, a LED driving method and a controller for LED driver are discussed in the present invention. The LED driver detects the phase of the input signal which is phase cut by a triac from a pre-E-transformer. The LED driver regulates the current flowing through the LED strings by varying the phase of the input signal.

11 Claims, 3 Drawing Sheets

LED DRIVER, LED DRIVING METHOD AND CONTROLLER FOR LED DRIVER

CROSS-REFERENCE TO RELATED APPLICATION(S)

This application claims priority to and the benefit of Chinese Patent Application No. 201310717707.X, filed Dec. 23, 2013, which is incorporated herein by reference in its entirety.

TECHNICAL FIELD

The present invention relates to electronic circuits, more specifically, the present invention relates to LED (lighting emitting diode) drivers.

BACKGROUND

E-transformers are widely used in electronic circuits because of small volume, light weight, low cost, high converting efficiency and good reliability. An E-transformer firstly converts an AC input voltage to a DC voltage, and then converts the DC voltage to a high frequency lower AC voltage via an oscillator.

One application of the E-transformer is to provide driving for LED stings. Prior art using a boost PFC (power factor correction) circuit to drive LED strings, and using a triac to execute phase cut to realize LED dimming. However, conventional E-transformers are designed for halogen lamps, but LEDs have a much lower power level than halogen lamps, so using conventional E-transformers to drive LED may lead to flicker.

SUMMARY

It is an object of the present invention to provide an improved LED driver, which solves the above problems.

In accomplishing the above and other objects, there has been provided, in accordance with an embodiment of the present invention, a control circuit used in a LED driver, the LED driver includes an input port configured to receive an input signal, an output port configured to provide a driving voltage to a LED string, an intermediate node, a step-up stage having a first power switch coupled between the input port and the intermediate node, and a step-down stage having a second power switch and a third power switch coupled between the intermediate node and the output port, the control circuit comprising: a phase detector, having an input terminal coupled to the input port to receive the input signal, a first output terminal configured to generate a phase detecting signal indicative of phase information of the input signal, and a second output terminal configured to generate a cycle detecting signal indicative of cycle information of the input signal, wherein the cycle detecting signal is a short pulse signal; a step-up comparator, having a first input terminal configured to receive a reference signal, a second input terminal configured to receive a voltage feedback signal indicative of a voltage at the Intermediate node, and an output terminal configured to generate a step-up comparison signal based on the reference signal and the voltage feedback signal; a logical OR unit, having a first input terminal coupled to the second output terminal of the phase detector to receive the cycle detecting signal, a second input terminal coupled to the output terminal of the step-up comparator to receive the step-up comparison signal, and an output terminal configured to generate a step-up enable signal by executing logical OR operation on the cycle detecting signal and the step-up comparison signal; a step-up controller, coupled to the logical OR unit to receive the step-up enable signal, to get enabled or disabled by the step-up enable signal, and to generate a step-up control signal, the step-up control signal being used to control the first power switch; a logical AND unit, having a first input terminal coupled to the first output terminal of the phase detector to receive the phase detecting signal, a second input terminal coupled to the step-up comparator to receive the step-up comparison signal, and an output terminal configured to generate a logical AND signal by executing logical AND operation on the phase detecting signal and the step-up comparison signal; an average circuit, coupled to the output terminal of the logical AND unit to receive the logical AND signal and to generate an average signal; and a step-down controller, having a first input terminal configured to receive a LED current sense signal indicative of a current flowing through the LED string, a second input terminal coupled to the average circuit to receive the average signal, and an output terminal configured to generate a step-down control signal to control the second power switch and the third power switch.

In addition, there has been provided, in accordance with an embodiment of the present invention, a LED driver, comprising: an input port, configured to receive an input signal, wherein the input signal is a phase cut voltage from a pre-E-transformer, the pre-E-transformer is with triac; an output port, configured to provide a driving voltage; an Intermediate node; an input capacitor, coupled between the input port and a reference ground; a first inductor and a diode, series coupled between the input port and the Intermediate node; a first power switch, coupled between the reference ground and the conjunction node of the first inductor and the diode; an Intermediate capacitor, coupled between the Intermediate node and the reference ground; a second power switch and a second inductor, series coupled between the Intermediate node and the output port; a third power switch, coupled between the reference ground and the conjunction node of the second power switch and the second inductor; an output capacitor, coupled between the output port and the reference ground; a LED string and a sense resistor, series coupled between the output port and the reference ground; a phase detector, having an input terminal coupled to the input port to receive the input signal, a first output terminal configured to generate a phase detecting signal indicative of phase information of the input signal, and a second output terminal configured to generate a cycle detecting signal indicative of cycle information of the input signal, wherein the cycle detecting signal is a short pulse signal; a step-up comparator, having a first input terminal configured to receive a reference signal, a second input terminal configured to receive a voltage feedback signal indicative of a voltage at the Intermediate node, and an output terminal configured to generate a step-up comparison signal based on the reference signal and the voltage feedback signal; a logical OR unit, having a first input terminal coupled to the second output terminal of the phase detector to receive the cycle detecting signal, a second input terminal coupled to the output terminal of the step-up comparator to receive the step-up comparison signal, and an output terminal configured to generate a step-up enable signal by executing logical OR operation on the cycle detecting signal and the step-up comparison signal; a step-up controller, coupled to the logical OR unit to receive the step-up enable signal, to get enabled or disabled by the step-up enable signal, and to generate a step-up control signal, the step-up control signal being used to control the first power switch; a logical AND unit, having a first input terminal coupled to the first output terminal of the phase detector to receive the phase detecting signal, a second input terminal coupled to the step-up comparator to receive the step-up comparison signal, and an output terminal configured to generate a logical AND signal by executing logical AND operation on the phase detecting signal and the step-up comparison signal; an average circuit, coupled to the output terminal of the logical AND unit to receive the logical AND signal and to generate an average signal; and a step-down controller, having a first input terminal coupled to the conjunction node of the LED string and the current sense resistor to receive a LED current sense signal indicative of a current flowing through the LED string, a second input terminal coupled to the average circuit to receive the average signal, and an output terminal configured to generate a step-down control signal to control the second power switch and the third power switch.

Furthermore, there has been provided, in accordance with an embodiment of the present invention, a LED driving method, comprising: receiving an input signal, the input signal being a phase cut voltage from a pre-E-transformer, the pre-E-transformer being with triac; generating a phase detecting signal indicative of phase information of the input signal; generating a short pulse cycle detecting signal indicative of cycle information of the input signal in response to a falling edge of the phase detecting signal; stepping up the input signal to an intermediate voltage when a step-up controller is enabled; stepping down the intermediate voltage to generate a driving voltage; generating a step-up comparison signal by comparing the intermediate voltage with an upper threshold and a lower threshold; enabling the step-up controller when either the step-up comparison signal is logical high or during the short pulse period of the cycle detecting signal; averaging the phase detecting signal to generate an average signal when the step-up comparison signal is logical high; and holding the average signal when the step-up comparison signal is logical low; and controlling a current flowing through a LED current string to be proportional to the average signal.

The use of the similar reference label in different drawings indicates the same of like components.

DETAILED DESCRIPTION

Embodiments of circuits for LED driver and LED driving method are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
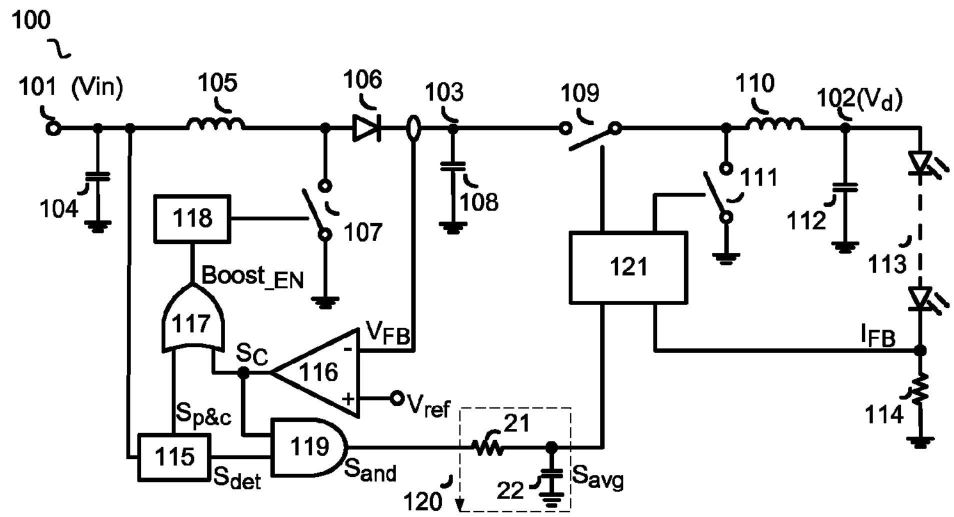
FIG. 1 schematically shows a LED driver 100 in accordance with an embodiment of the present invention.

FIG. 1 schematically shows a LED driver 100 in accordance with an embodiment of the present invention. In the example of FIG. 1, the LED driver 100 comprises: an input port 101, configured to receive an input signal Vin, wherein the input signal Vin is a phase cut voltage from a pre-E-transformer with triac; an output port 102, configured to provide a driving voltage $V_d$; an Intermediate node 103; an input capacitor 104, coupled between the input port 101 and a reference ground; a first inductor 105 and a diode 106, series coupled between the input port 101 and the Intermediate node 103; a first power switch 107, coupled between the reference ground and the conjunction node of the first inductor 105 and the diode 106; an Intermediate capacitor 108, coupled between the Intermediate node 103 and the reference ground; a second power switch 109 and a second inductor 110, series coupled between the Intermediate node 103 and the output port 102; a third power switch 111, coupled between the reference ground and the conjunction node of the second power switch 109 and the second inductor 110; an output capacitor 112, coupled between the output port 102 and the reference ground; a LED string 113 and a sense resistor 114, series coupled between the output port 102 and the reference ground; a phase detector 115, having an input terminal coupled to the input port 101 to receive the input signal, a first output terminal configured to generate a phase detecting signal $S_{det}$ indicative of phase information of the input signal Vin, and a second output terminal configured to generate a cycle detecting signal $S_{p\&c}$ indicative of cycle information of the input signal Vin, wherein the cycle detecting signal $S_{p\&c}$ is a short pulse signal (e.g., the short pulse has a high level lasting for 100 ns or less); a step-up comparator 116, having a first input terminal configured to receive a reference signal $V_{ref}$, a second input terminal configured to receive a voltage feedback signal $V_{FB}$ indicative of a voltage at the Intermediate node 103, and an output terminal configured to generate a step-up comparison signal $S_C$ based on the reference signal $V_{ref}$ and the voltage feedback signal $V_{FB}$; a logical OR unit 117, having a first input terminal coupled to the second output terminal of the phase detector 115 to receive the cycle detecting signal $S_{p\&c}$, a second input terminal coupled to the output terminal of the step-up comparator 116 to receive the step-up comparison signal $S_c$, and an output terminal configured to generate a step-up enable signal $Boost_{\_EN}$ by executing logical OR operation on the cycle detecting signal $S_{p\&c}$ and the step-up comparison signal $S_C$; a step-up controller 118, coupled to the logical OR unit 117 to receive the step-up enable signal $Boost_{\_EN}$, to get enabled or disabled by the step-up enable signal $Boost_{\_EN}$, and to generate a step-up control signal, the step-up control signal being used to control the first power switch 107; a logical AND unit 119, having a first input terminal coupled to the first output terminal of the phase detector 115 to receive the phase detecting signal $S_{det}$, a second input terminal coupled to the step-up comparator 116 to receive the step-up comparison signal $S_C$, and an output terminal configured to generate a logical AND signal $S_{and}$ by executing logical AND operation on the phase detecting signal $S_{det}$ and the step-up comparison signal $S_C$; an average circuit 120, coupled to the output terminal of the logical AND unit 119 to receive the logical AND signal $S_{and}$ and to generate an average signal $S_{avg}$; and a step-down controller 121, having a first input terminal coupled to the conjunction node of the LED string 113 and the current sense resistor 114 to receive a LED current sense signal $I_{FB}$ indicative of a current flowing through the LED string 113, a second input terminal coupled to the average circuit 120 to receive the average signal $S_{avg}$, and an output terminal configured to generate a step-down control signal to control the second power switch 109 and the third power switch 111, so as to regulate the current flowing through the LED string 113 to be proportional to the average signal $S_{avg}$.

As can been seen, in the example of FIG. 1, the first inductor 105, the diode 106, the first power switch 107 and the intermediate capacitor 108 constitute a typical boost topology; the second power switch 109, the second inductor 110, the third power switch 111 and the output capacitor 112 constitute a typical buck topology; the phase detector 115, the step-up comparator 116, the logical OR unit 117, the step-up controller 118, the logical AND unit 119, the average circuit 120 and the step-down controller 121 constitute the control circuit of the LED driver. That is, the LED driver 100 includes an input port 101 configured to receive an input signal Vin, an output port 102 configured to provide a driving voltage $V_d$ to a LED string 113, an intermediate node 103, a step-up stage having a first power switch 107, a step-down stage having a second power switch 109 and a third power switch 111, and a control circuit, wherein the step-up stage is coupled between the input port 101 and the intermediate node 103, and the step-down stage is coupled between the intermediate node 103 and the output port 102.

Figure 2:
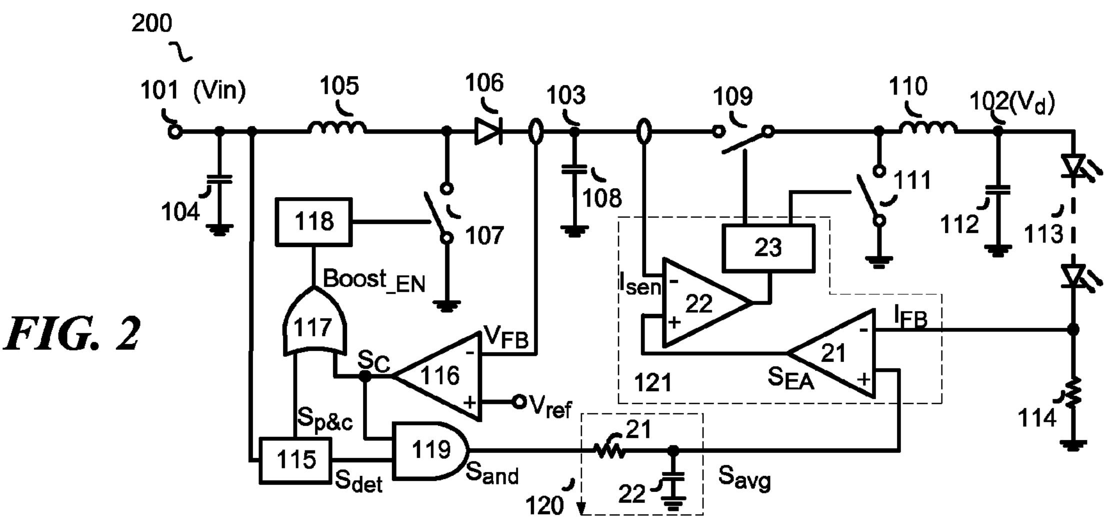
FIG. 2 schematically shows a LED driver 200 with a schematic circuit configuration of the step-down controller 121 in accordance with an embodiment of the present invention.

FIG. 2 schematically shows a LED driver 200 with a schematic circuit configuration of the step-down controller 121 in accordance with an embodiment of the present invention. In the example of FIG. 2, the step-down controller 121 comprises: an error amplifier 21, having a first input terminal coupled to the conjunction node of the LED string 113 and the current sense resistor 114 to receive the LED current sense signal $I_{FB}$, a second input terminal coupled to the average circuit 120 to receive the average signal $S_{avg}$, and an output terminal configured to generate an error amplified signal $S_{EA}$; a step-down comparator 22, having a first input terminal coupled to the output terminal of the error amplifier 21 to receive the error amplified signal $S_{EA}$, a second input terminal configured to receive an inductor current sense signal $I_{sen}$ indicative of a current flowing through the second inductor 110 (one skilled in the art should realize that this inductor current sense signal $I_{sen}$ is also indicative of a current flowing through the second power switch 109), and an output terminal configured to generate a step-down comparison signal; and a control and logical circuit 23, coupled to the step-down comparator 22 to receive the step-down comparison signal, and to generate the step-down control signal based on the step-down comparison signal.

In on embodiment, the average circuit 120 comprises an average resistor 31 and an average capacitor 32 coupled in series between the output terminal of the logical AND unit 119 and the reference ground, wherein the average signal $S_{avg}$ is generated at the conjunction node of the average resistor 31 and the average capacitor 32.

Figure 3:
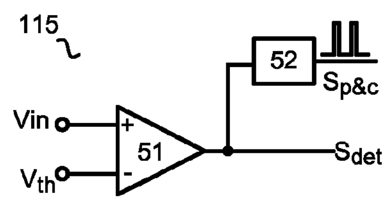
FIG. 3 schematically shows a circuit configuration of the phase detector 115 in accordance with an embodiment of the present invention.

FIG. 3 schematically shows a circuit configuration of the phase detector 115 in accordance with an embodiment of the present invention. In the example of FIG. 3, the phase detector 115 comprises: a phase comparator 51, having a first input terminal configured to receive a threshold signal $V_{th}$, a second input terminal configured to receive the input signal Vin, and an output terminal configured to generate the phase detecting signal $S_{det}$ based on the threshold signal $V_{th}$ and the input signal Vin; and a short pulse circuit 52, coupled to the output terminal of the phase comparator 51 to receive the phase detecting signal $S_{det}$, and to generate the cycle detecting signal $S_{p\&c}$ with a short pulse in response to a falling edge of the phase detecting signal $S_{det}$.

In one embodiment, the threshold $V_{th}$ has a voltage level around 0.1V.

In one embodiment, the step-up comparator 116 comprises a hysteresis comparator having a hysteresis $V_{hys}$, i.e., the step-up comparator 116 has an upper threshold $V_{th1}=V_{ref}+V_{hys}$, and a lower threshold $V_{th2}=V_{ref}-V_{hys}$.

Figure 4:
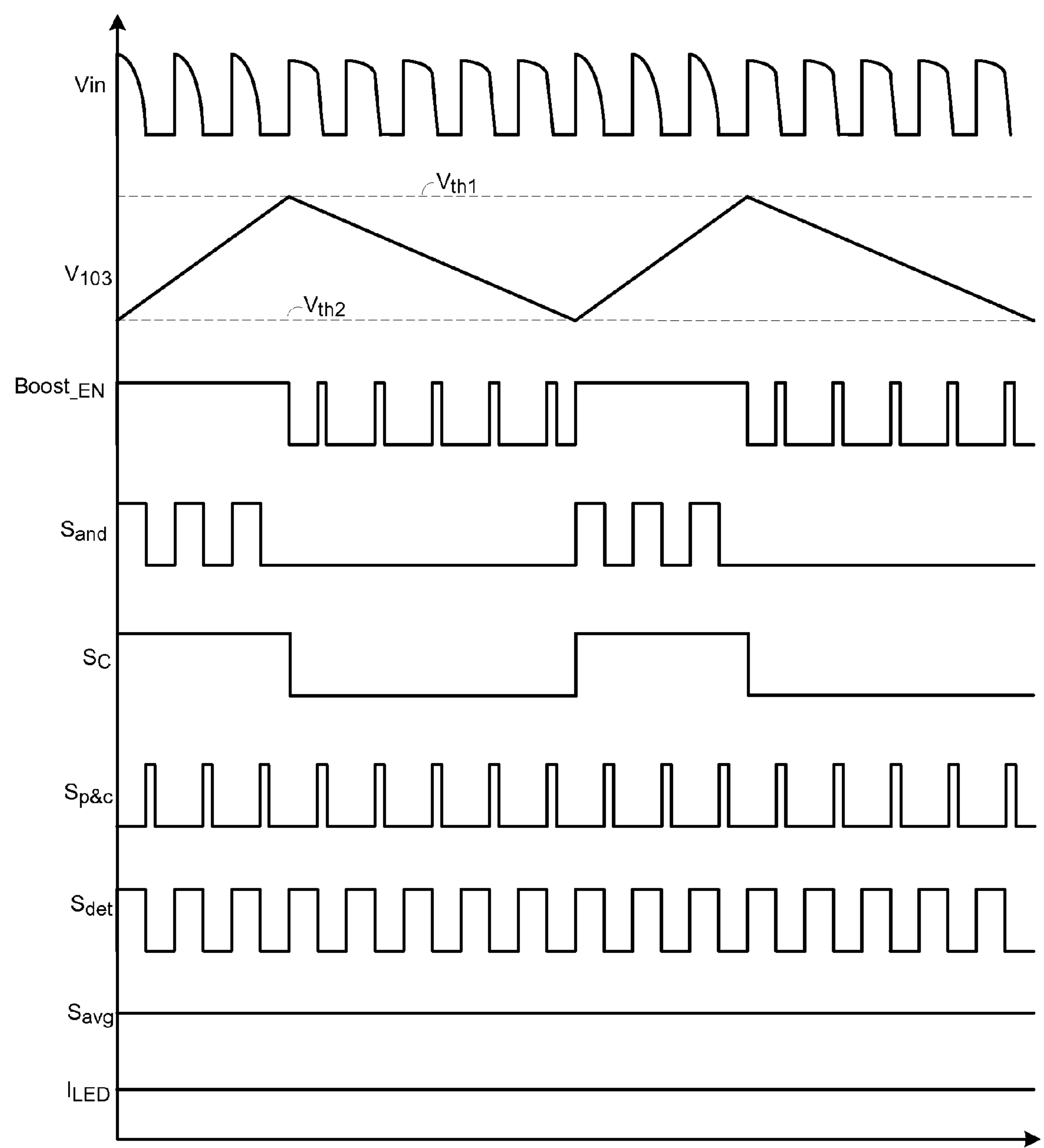
FIG. 4 schematically shows the timing waveforms of the input signal Vin, the voltage $V_{103}$ at the intermediate node 103, the step-up enable signal $Boost_{\_EN}$, the logical AND signal $S_{and}$, the step-up comparison signal $S_C$, the cycle detecting signal $S_{p\&c}$, the phase detecting signal $S_{det}$, the average signal $S_{avg}$ and the current $I_{LED}$ flowing through the LED string of the LED driver 100 in FIG. 1 and the LED driver 200 in FIG. 2.

The operation principle of the LED driver 100/200 would be discussed in the following in reference to FIG. 4. When the LED drivers 100 and 200 are in operation, if the voltage $V_{103}$ at the intermediate node 103 is lower than the upper threshold $V_{th1}$ of the step-up comparator 116, the step-up comparison signal $S_C$ is logical high, so as the step-up enable signal $Boost_{\_EN}$ provided by the logical OR unit 117. Then the step-up controller 118 is enabled, and provides the step-up control signal to control the operation of the first power switch 107. Accordingly, the voltage $V_{103}$ at the intermediate node 103 goes up. When the voltage $V_{103}$ at the intermediate node 103 reaches the upper threshold $V_{th1}$ of the step-up comparator 116, the step-up comparison signal $S_C$ turns to logical low. As a result, the step-up enable signal $Boost_{\_EN}$ provided by the logical OR unit 117 is determined by the cycle detecting signal $S_{p\&c}$. At the phase detector 115, the phase detector 115 compares the input signal Vin with the threshold signal $V_{th}$. When the input signal Vin is higher than zero (i.e., the non-phase-cut part of the input signal Vin), the phase detecting signal $S_{det}$ is logical high; when the input signal Vin is zero (i.e. the phase-cut part of the input signal Vin), the phase detecting signal $S_{det}$ is logical low. Thus, there's a falling edge of the phase detecting signal $S_{det}$ from the end of the non-phase-cut part to start of the phase cut part of the input signal Vin. The short pulse circuit 52 generates the cycle detecting signal $S_{p\&c}$ with a short pulse in response to the falling edge of the phase detecting signal $S_{det}$. The logical OR unit 117 also generates the step-up enable signal $Boost_{\_EN}$ with a short pulse, to enable the step-up controller 118 and the first power switch 107 in the short pulse time period. Accordingly, the input signal Vin is discharged. After the short pulse time period, the step-up controller 118 is disabled, and the first power switch 107 is idle. Then the voltage $V_{103}$ at the intermediate node 103 starts to decrease. When the voltage $V_{103}$ at the intermediate node 103 decreases to be lower than the lower threshold $V_{th2}$ of the step-up comparator 116, the step-up comparison signal $S_C$ turns to logical high; and the step-up controller 118 is re-enabled, to control the operation of the first power switch 107.

At the logical AND unit 119, the logical AND unit 119 executes the logical AND operation on the phase detecting signal $S_{det}$ and the step-up comparison signal $S_C$, to generate the logical AND signal $S_{and}$, which is averaged by the average circuit 120 to get the average signal $S_{avg}$. Then the average signal $S_{avg}$ is delivered to the step-down controller 121, so as to regulate the current flowing through the LED string 113 to be proportional to the average signal $S_{avg}$.

Several embodiments of the foregoing LED driver provide better LED current regulation in the E-transformer application compared to conventional technique discussed above. Unlike the conventional technique, several embodiments of the foregoing LED driver detect the phase of the input signal provided by the pre-E-transformer. If the phase of the input signal is varied, the phase detecting signal is varied, so does the average signal, and then the current flowing through the LED string is adjusted to the desired value. That is, several embodiments of the foregoing LED driver regulate the current flowing through the LED string by varying the phase of the input signal.

Figure 5:
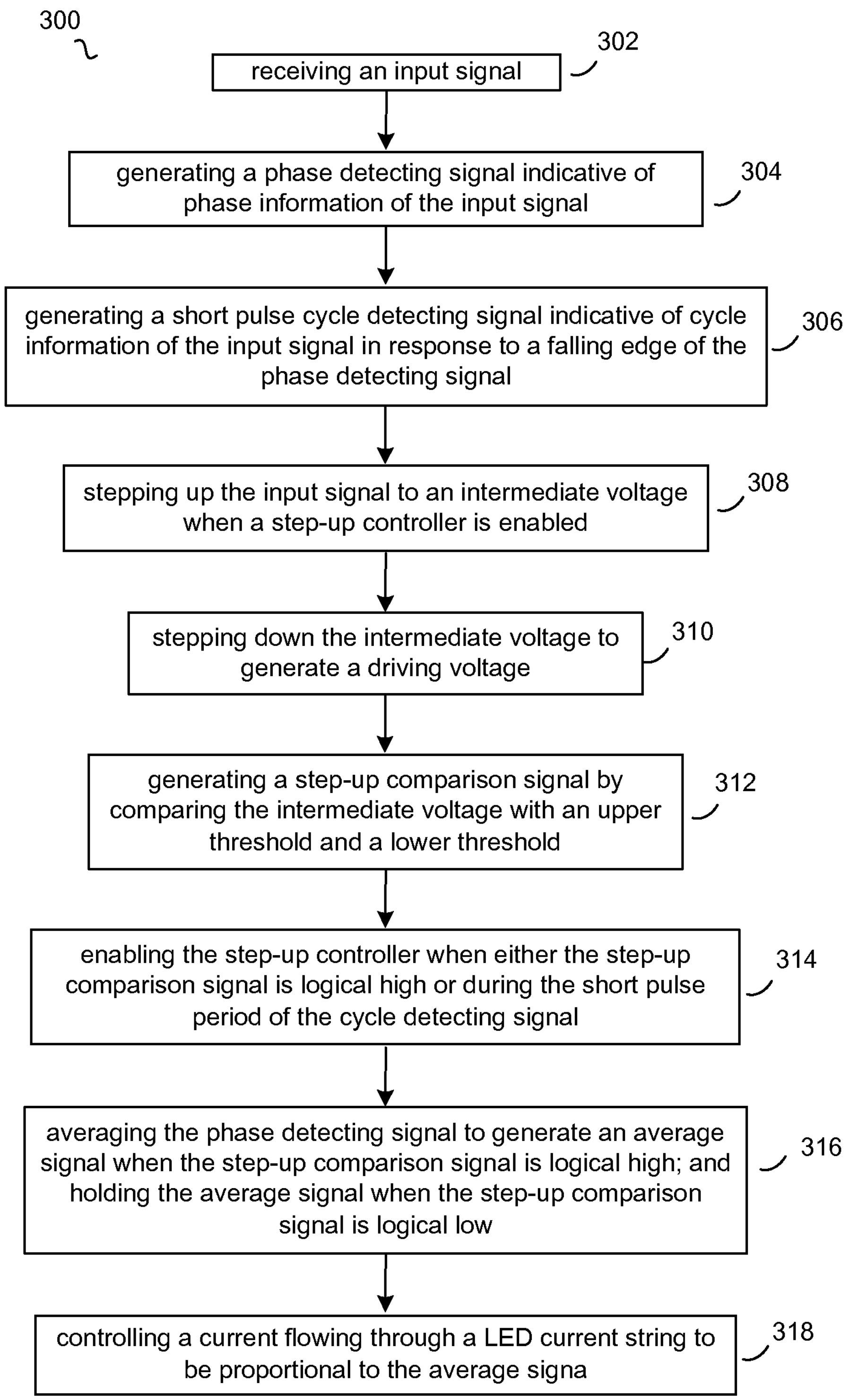
FIG. 5 schematic shows a flowchart 300 of a LED driving method in accordance with an embodiment of the present invention.

FIG. 5 schematic shows a flowchart 300 of a LED driving method in accordance with an embodiment of the present invention. The LED driving method comprising:

Step 302, receiving an input signal, the input signal being a phase cut voltage from a pre-E-transformer, the pre-E-transformer being with triac.

Step 304, generating a phase detecting signal indicative of phase information of the input signal.

Step 306, generating a short pulse cycle detecting signal indicative of cycle information of the input signal in response to a falling edge of the phase detecting signal.

Step 308, stepping up the input signal to an intermediate voltage when a step-up controller is enabled.

Step 310, stepping down the intermediate voltage to generate a driving voltage.

Step 312, generating a step-up comparison signal by comparing the intermediate voltage with an upper threshold and a lower threshold.

Step 314, enabling the step-up controller when either the step-up comparison signal is logical high or during the short pulse period of the cycle detecting signal.

Step 316, averaging the phase detecting signal to generate an average signal when the step-up comparison signal is logical high; and holding the average signal when the step-up comparison signal is logical low. And Step 318, controlling a current flowing through a LED current string to be proportional to the average signal.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

We claim:

1. A control circuit used in a LED driver, the LED driver includes an input port configured to receive an input signal, an output port configured to provide a driving voltage to a LED string, an intermediate node, a step-up stage having a first power switch coupled between the input port and the intermediate node, and a step-down stage having a second power switch and a third power switch coupled between the intermediate node and the output port, the control circuit comprising:

a phase detector, having an input terminal coupled to the input port to receive the input signal, a first output terminal configured to generate a phase detecting signal indicative of phase information of the input signal, and a second output terminal configured to generate a cycle detecting signal indicative of cycle information of the input signal, wherein the cycle detecting signal is a short pulse signal;

a step-up comparator, having a first input terminal configured to receive a reference signal, a second input terminal configured to receive a voltage feedback signal indicative of a voltage at the Intermediate node, and an output terminal configured to generate a step-up comparison signal based on the reference signal and the voltage feedback signal;

a logical OR unit, having a first input terminal coupled to the second output terminal of the phase detector to receive the cycle detecting signal, a second input terminal coupled to the output terminal of the step-up comparator to receive the step-up comparison signal, and an output terminal configured to generate a step-up enable signal by executing logical OR operation on the cycle detecting signal and the step-up comparison signal;

a step-up controller, coupled to the logical OR unit to receive the step-up enable signal, to get enabled or disabled by the step-up enable signal, and to generate a step-up control signal, the step-up control signal being used to control the first power switch;

a logical AND unit, having a first input terminal coupled to the first output terminal of the phase detector to receive the phase detecting signal, a second input terminal coupled to the step-up comparator to receive the step-up comparison signal, and an output terminal configured to generate a logical AND signal by executing logical AND operation on the phase detecting signal and the step-up comparison signal;

an average circuit, coupled to the output terminal of the logical AND unit to receive the logical AND signal and to generate an average signal; and a step-down controller, having a first input terminal configured to receive a LED current sense signal indicative of a current flowing through the LED string, a second input terminal coupled to the average circuit to receive the average signal, and an output terminal configured to generate a step-down control signal to control the second power switch and the third power switch.

2. The control circuit of claim 1, wherein the step-down controller comprises:

an error amplifier, having a first input terminal configured to receive the LED current sense signal, a second input terminal coupled to the average circuit to receive the average signal, and an output terminal configured to generate an error amplified signal;

a step-down comparator, having a first input terminal coupled to the output terminal of the error amplifier to receive the error amplified signal, a second input terminal configured to receive an inductor current sense signal indicative of a current flowing through the second power switch, and an output terminal configured to generate a step-down comparison signal; and a control and logical circuit, coupled to the step-down comparator to receive the step-down comparison signal, and to generate the step-down control signal based on the step-down comparison signal.

3. The control circuit of claim 1, the average circuit comprises an average resistor and an average capacitor coupled in series between the output terminal of the logical AND unit and the reference ground, wherein the average signal is generated at the conjunction node of the average resistor and the average capacitor.

4. The control circuit of claim 1, wherein the phase detector comprises:

a phase comparator, having a first input terminal configured to receive a threshold signal, a second input terminal configured to receive the input signal, and an output terminal configured to generate the phase detecting signal based on the threshold signal and the input signal; and a short pulse circuit, coupled to the output terminal of the phase comparator to receive the phase detecting signal, and to generate the cycle detecting signal with a short pulse in response to a falling edge of the phase detecting signal.

5. The control circuit of claim 1, wherein the step-up comparator comprises a hysteresis comparator.

6. A LED driver, comprising:

an input port, configured to receive an input signal, wherein the input signal is a phase cut voltage from a pre-E-transformer, the pre-E-transformer is with triac;

an output port, configured to provide a driving voltage;

an Intermediate node;

an input capacitor, coupled between the input port and a reference ground;

a first inductor and a diode, series coupled between the input port and the Intermediate node;

a first power switch, coupled between the reference ground and the conjunction node of the first inductor and the diode;

an Intermediate capacitor, coupled between the Intermediate node and the reference ground;

a second power switch and a second inductor, series coupled between the Intermediate node and the output port;

a third power switch, coupled between the reference ground and the conjunction node of the second power switch and the second inductor;

an output capacitor, coupled between the output port and the reference ground;

a LED string and a sense resistor, series coupled between the output port and the reference ground;

a phase detector, having an input terminal coupled to the input port to receive the input signal, a first output terminal configured to generate a phase detecting signal indicative of phase information of the input signal, and a second output terminal configured to generate a cycle detecting signal indicative of cycle information of the input signal, wherein the cycle detecting signal is a short pulse signal;

a step-up comparator, having a first input terminal configured to receive a reference signal, a second input terminal configured to receive a voltage feedback signal indicative of a voltage at the Intermediate node, and an output terminal configured to generate a step-up comparison signal based on the reference signal and the voltage feedback signal;

a logical OR unit, having a first input terminal coupled to the second output terminal of the phase detector to receive the cycle detecting signal, a second input terminal coupled to the output terminal of the step-up comparator to receive the step-up comparison signal, and an output terminal configured to generate a step-up enable signal by executing logical OR operation on the cycle detecting signal and the step-up comparison signal;

a step-up controller, coupled to the logical OR unit to receive the step-up enable signal, to get enabled or disabled by the step-up enable signal, and to generate a step-up control signal, the step-up control signal being used to control the first power switch;

a logical AND unit, having a first input terminal coupled to the first output terminal of the phase detector to receive the phase detecting signal, a second input terminal coupled to the step-up comparator to receive the step-up comparison signal, and an output terminal configured to generate a logical AND signal by executing logical AND operation on the phase detecting signal and the step-up comparison signal;

an average circuit, coupled to the output terminal of the logical AND unit to receive the logical AND signal and to generate an average signal; and a step-down controller, having a first input terminal coupled to the conjunction node of the LED string and the current sense resistor to receive a LED current sense signal indicative of a current flowing through the LED string, a second input terminal coupled to the average circuit to receive the average signal, and an output terminal configured to generate a step-down control signal to control the second power switch and the third power switch.

7. The LED driver of claim 6, wherein the step-down controller comprises:

an error amplifier, having a first input terminal coupled to the conjunction node of the LED string and the current sense resistor to receive the LED current sense signal, a second input terminal coupled to the average circuit to receive the average signal, and an output terminal configured to generate an error amplified signal;

a step-down comparator, having a first input terminal coupled to the output terminal of the error amplifier to receive the error amplified signal, a second input terminal configured to receive an inductor current sense signal indicative of a current flowing through the second inductor, and an output terminal configured to generate a step-down comparison signal; and a control and logical circuit, coupled to the step-down comparator to receive the step-down comparison signal, and to generate the step-down control signal based on the step-down comparison signal.

8. The LED driver of claim 6, the average circuit comprises an average resistor and an average capacitor coupled in series between the output terminal of the logical AND unit and the reference ground, wherein the average signal is generated at the conjunction node of the average resistor and the average capacitor.

9. The LED driver of claim 6, wherein the phase detector comprises:

a phase comparator, having a first input terminal configured to receive a threshold signal, a second input terminal configured to receive the input signal, and an output terminal configured to generate the phase detecting signal based on the threshold signal and the input signal; and a short pulse circuit, coupled to the output terminal of the phase comparator to receive the phase detecting signal, and to generate the cycle detecting signal with a short pulse in response to a falling edge of the phase detecting signal.

10. The LED driver of claim 6, wherein the step-up comparator comprises a hysteresis comparator.

11. A LED driving method, comprising:

receiving an input signal, the input signal being a phase cut voltage from a pre-E-transformer, the pre-E-transformer being with triac;

generating a phase detecting signal indicative of phase information of the input signal;

generating a short pulse cycle detecting signal indicative of cycle information of the input signal in response to a falling edge of the phase detecting signal;

stepping up the input signal to an intermediate voltage when a step-up controller is enabled;

stepping down the intermediate voltage to generate a driving voltage;

generating a step-up comparison signal by comparing the intermediate voltage with an upper threshold and a lower threshold;

enabling the step-up controller when either the step-up comparison signal is logical high or during the short pulse period of the cycle detecting signal;

averaging the phase detecting signal to generate an average signal when the step-up comparison signal is logical high; and holding the average signal when the step-up comparison signal is logical low; and controlling a current flowing through a LED current string to be proportional to the average signal.

* * * * *